(12) United States Patent
Li

(10) Patent No.: US 10,820,341 B2
(45) Date of Patent: Oct. 27, 2020

(54) DETERMINATION OF REQUIREMENT OF UE PROCESSING TIME IN NR

(71) Applicant: MEDIATEK INC., Hsinchu (TW)

(72) Inventor: Xiu-Sheng Li, Hsinchu (TW)

(73) Assignee: MediaTek INC., Hsin-Chu (TW)

(*) Notice: Subject to any disclaimer, the term of this patent is extended or adjusted under 35 U.S.C. 154(b) by 0 days.

(21) Appl. No.: 16/264,677

(22) Filed: Feb. 1, 2019

(65) Prior Publication Data

US 2019/0254060 A1 Aug. 15, 2019

Related U.S. Application Data

(60) Provisional application No. 62/629,187, filed on Feb. 12, 2018.

(51) Int. Cl.
*H04W 4/00* (2018.01)
*H04W 72/14* (2009.01)
(Continued)

(52) U.S. Cl.
CPC .......... *H04W 72/14* (2013.01); *H04L 1/1812* (2013.01); *H04W 72/1278* (2013.01); *H04W 76/15* (2018.02)

(58) Field of Classification Search
CPC . H04W 72/14; H04W 72/1278; H04W 76/15; H04L 1/1812; H04L 5/0055; H04L 5/0082; H04L 5/0092; H04L 5/001
(Continued)

(56) References Cited

U.S. PATENT DOCUMENTS 9,681,423 B2 6/2017 Kim et al.
2012/0269180 A1* 10/2012 Li .................... H04L 5/0055
370/336
(Continued)

FOREIGN PATENT DOCUMENTS

| CN | 103580831 A | 7/2012 |
|---|---|---|
| CN | 105580304 A | 9/2013 |
| WO | WO2016187066 A | 5/2015 |

OTHER PUBLICATIONS

International Search Report and Written Opinion of International Search Authority for PCT/CN2019/074537 dated Apr. 30, 2019 (9 pages).

(Continued)

*Primary Examiner* — Chuong T Ho

(74) *Attorney, Agent, or Firm* — Imperium Patent Works; Zheng Jin

(57) ABSTRACT

A method of providing a relaxed UE processing time for uplink transmission in NR is proposed. The UE processing time of uplink transmission is required for HARQ-ACK after the reception of downlink data over physical data shared channel (PDSCH). The UE processing time is also required for physical uplink share channel (PUSCH) transmission after the reception of an uplink grant. Under non-co-located carrier aggregation, the timing difference between the signals received at the UE in different cells could be up to 30.26 us, which increases the UE processing time for uplink transmission. In accordance with one novel aspect, the UE processing time requirement is relaxed according to the timing difference requirement for carrier aggregation, when CA is operated. In addition, the UE processing time requirement also depends on the applied subcarrier spacing (SCS) in NR systems.

20 Claims, 4 Drawing Sheets

(51) Int. Cl.
*H04W 72/12* (2009.01)
*H04L 1/18* (2006.01)
*H04W 76/15* (2018.01)

(58) Field of Classification Search
USPC .................................................. 370/329, 330
See application file for complete search history.

(56) References Cited

U.S. PATENT DOCUMENTS

| | | | |
|---|---|---|---|
| 2014/0044025 A1 | 2/2014 | Li et al. | 370/280 |
| 2015/0085720 A1 | 3/2015 | Gaal et al. | 370/280 |
| 2016/0270139 A1* | 9/2016 | Rahman | H04W 72/048 |
| 2016/0277169 A1 | 9/2016 | Park | 370/329 |
| 2016/0337893 A1 | 11/2016 | Gheorghiu et al. | 370/252 |
| 2016/0338039 A1* | 11/2016 | Van Der Velde | H04L 5/001 |
| 2016/0353442 A1 | 12/2016 | Uchino et al. | 370/329 |
| 2019/0109688 A1* | 4/2019 | Kim | H04L 5/001 |
| 2019/0230498 A1* | 7/2019 | Lee | H04W 72/042 |
| 2019/0253977 A1* | 8/2019 | Wang | H04W 52/146 |

OTHER PUBLICATIONS

Taiwan IPO, office action for the TW patent application 108104362 (no English translation is available) dated Nov. 29, 2019 (7 pages).

\* cited by examiner

| FREQUENCY RANGE | MAXIMUM RECEIVE TIMING DIFFERENCE (us) |
|---|---|
| FR1 | 3 |
| FR2 | 3 |

INTRA-BAND NON-CONTIGUOUS NR CARRIER AGGREGATION

| FREQUENCY RANGE | MAXIMUM RECEIVE TIMING DIFFERENCE (us) |
|---|---|
| FR1 | 33 |
| FR2 | 8 |

INTER-BAND NR CARRIER AGGREGATION

DETERMINATION OF REQUIREMENT OF UE PROCESSING TIME IN NR

CROSS REFERENCE TO RELATED APPLICATIONS

This application claims priority under 35 U.S.C. § 119 from U.S. Provisional Application No. 62/629,187 entitled "Determination of Requirement of UE Processing Time in NR," filed on Feb. 12, 2018, the subject matter of which is incorporated herein by reference.

TECHNICAL FIELD

The disclosed embodiments relate to mobile communication networks, and more specifically, to requirement of user equipment (UE) processing time for uplink transmission in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard.

The signal bandwidth for next generation 5G new radio (NR) system is estimated to increase to up to hundreds of MHz for below 6 GHz bands and even to values of GHz in case of millimeter wave bands. Furthermore, the NR peak rate requirement can be up to 20 Gbps, which is more than ten times of LTE. It is therefore expected that 5G NR system needs to support dramatically larger transport block (TB) sizes as compared to LTE, which result in a much more code block (CB) segments per TB. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported.

A technique referred to as Hybrid Automatic Repeat ReQuest (HARQ) is employed for error detection and correction. HARQ is a combination of forward error correction (FEC) and Automatic Repeat ReQuest (ARQ). It uses error detection to detect uncorrectable errors. The packets in error are discarded and the receiver requests retransmission of corrupted packets. HARQ consists of multiple HARQ processes with each operation on a single transport block (TB). The transmitter stops and waits for an acknowledgement (ACK) from the receiver, called HARQ-ACK, after each transmission of TB. The HARQ-ACK indicates whether the TB is correctly received or not. In 3GPP 5G NR, data services with low latency is a key differentiation from 4G LTE. From a latency perspective, the time between the reception of data and transmission of HARQ-ACK should be as short as possible.

The UE processing time of uplink transmission is required for HARQ-ACK after the reception of downlink data over physical data shared channel (PDSCH). In addition, the UE processing time is also required for physical uplink share channel (PUSCH) transmission after the reception of an uplink grant. Such UE processing time is studied and defined in 3GPP specification. However, there is one aspect is missing when carrier aggregation (CA) is applied. The concept of carrier aggregation has been introduced to enhance the system throughput. With CA, two or more component carriers (CCs) are aggregated to support wider transmission bandwidth. The demand for higher bandwidth may require exploiting further on CA operation to aggregate cells from different base stations to serve a single UE, called non-co-located carrier aggregation, as compared to collocated carrier aggregation. Non-co-located CA is typically deployed for inter-band CA. In general, CA considers timing difference between different cells. As a result, the UE processing time needs to be refined.

SUMMARY

A method of providing a relaxed UE processing time for uplink transmission in NR is proposed. The UE processing time of uplink transmission is required for HARQ-ACK after the reception of downlink data over physical data shared channel (PDSCH). The UE processing time is also required for physical uplink share channel (PUSCH) transmission after the reception of an uplink grant. From LTE experience, under non-co-located carrier aggregation, the timing difference between the signals received at the UE in different cells could be up to 30.26 us, which increases the UE processing time for uplink transmission. In accordance with one novel aspect, the UE processing time requirement is relaxed according to the timing difference requirement for carrier aggregation, when CA is operated. In addition, the UE processing time requirement also depends on the applied subcarrier spacing (SCS) in NR systems.

In one embodiment, a primary base station establishes a primary connection with a user equipment (UE) in a primary cell in a wireless communication network. The primary cell comprises a first downlink (DL) component carrier (CC) and a first uplink (UL) CC. The primary base station configuring a second connection for the UE in a secondary cell under intra-band non-contiguous carrier aggregation (CA) or inter-band CA. The secondary cell comprises a second downlink CC. The primary base station transmits a physical-layer signaling to the UE to schedule an UL transmission after a time period in response to a DL transmission. The time period is provided by the primary base station based on a UE processing time that is relaxed according to a timing difference requirement of the CA.

In another embodiment, a UE establishes a primary connection in a primary cell with a primary base station in a wireless communication network. The primary cell comprises a first downlink (DL) component carrier (CC) and a first uplink (UL) CC. The UE establishes a second connection in a secondary cell under intra-band non-contiguous carrier aggregation (CA) or inter-band CA. The secondary cell comprises a second downlink CC. The UE receives a physical-layer signaling for transmitting an UL transmission after a time period in response to a DL transmission. The UE performs the UL transmission when the time period provided by the primary base station is at least equal to a UE processing time that is relaxed according to a timing difference requirement of the CA.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
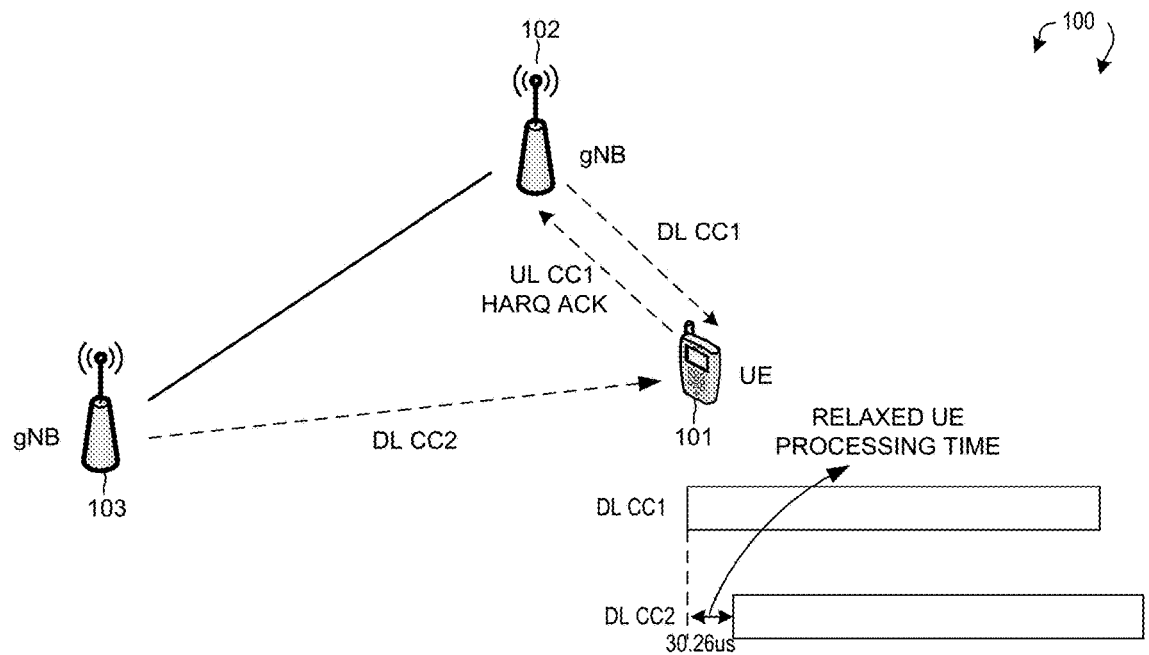
FIG. 1 illustrates a new radio (NR) mobile communication network with non-co-located carrier aggregation and uplink (UL) transmission timing in accordance with one novel aspect.

FIG. 1 illustrates a new radio (NR) mobile communication network with non-co-located carrier aggregation and uplink (UL) transmission timing in accordance with one novel aspect. Mobile communication network 100 is a 5G NR system having a first base station gNB 102, a second base station gNB 103, and a user equipment UE 101. Three main applications in 5G NR include enhanced Mobile Broadband (eMBB), Ultra-Reliable Low Latency Communications (URLLC), and massive Machine-Type Communication (MTC) under millimeter wave technology, small cell access, and unlicensed spectrum transmission. Multiplexing of eMBB & URLLC within a carrier is supported. In FIG. 1, non-co-located carrier aggregation is supported, where gNB 102 and gNB 103 are not collocated. UE 101 is served by both the primary base station gNB 102 over component carrier CC1 and the secondary base station gNB 103 over component carrier CC2. For downlink (DL) transmission, at the transmitter side, gNB 102/103 performs encoding and rate matching, and transmits the DL data to UE 101 over DL CC1/CC2, respectively. The DL data is scheduled by a physical downlink control channel (PDCCH) and transmitted over a physical downlink shared channel (PDSCH). As depicted in FIG. 1, the timing difference between the signals received from different component carrier CC1 and CC2 at the UE receiver could be up to 30.26 us, from LTE experience.

At the receiver side, UE 101 receives and decodes the DL data, and sends out an ACK or NACK back to gNB 102/103 based on the decoding result under Hybrid Automatic Repeat reQuest (HARQ) operation. HARQ consists of multiple HARQ processes with each operating on a single transport block (TB). The transmitter stops and waits for an HARQ-ACK or HARQ-NACK from the receiver after each transmission of TB. If a new TB turns out to be an erroneous TB after decoding, then gNB retransmits the TB after receiving the NACK, and UE performs HARQ operation via an HARQ controller and an HARQ buffer management circuit. In 3GPP 5G NR, data services with low latency becomes a key differentiation from 4G LTE. From a latency perspective, the time between the reception of data and transmission of HARQ-ACK should be as short as possible. However, an unnecessarily short time would increase the demand on the processing capability. To achieve low latency, UE throughput may be sacrificed for a tradeoff due to UE hardware limitation and power consumption.

In general, the UE processing time is studied and defined in 3GPP specification. The UE processing time of uplink transmission is required for HARQ-ACK after the reception of downlink data over physical downlink shared channel (PDSCH). In addition, the UE processing time is also required for physical uplink share channel (PUSCH) transmission after the reception of an uplink grant. However, there is one aspect is missing when carrier aggregation (CA) is applied. There are two different CA scenarios: intra-band CA and inter-band CA served by the same base station or different base stations. The demand for higher bandwidth may require exploiting further on CA operation to aggregate cells from different base stations to serve a single UE (non-co-located CA), as compared to collocated carrier aggregation.

Different bands for CA may provide different cell coverage. It is typical to have large cell for lower-band and small cell for higher-band, resulting in denser deployment for higher-band. Therefore, CCs in inter-band CA scenario may come from different base station (non-co-located), and the timing difference may be larger. For example, the timing difference between the signals received at UE 101 in different cells for non-co-located CA could be up to 30.26 us. While UE 101 has the reference timing of CC1 and CC2, the network may not know the precise time difference between CC1 and CC2, which increases the UE processing time for uplink transmission. In accordance with one novel aspect, the UE processing time requirement is relaxed according to the timing difference requirement (e.g., the maximum timing difference on CCs) for CA, when CA is operated. In addition, the UE processing time requirement also depends on the applied subcarrier spacing (SCS) in NR systems.

Figure 2:
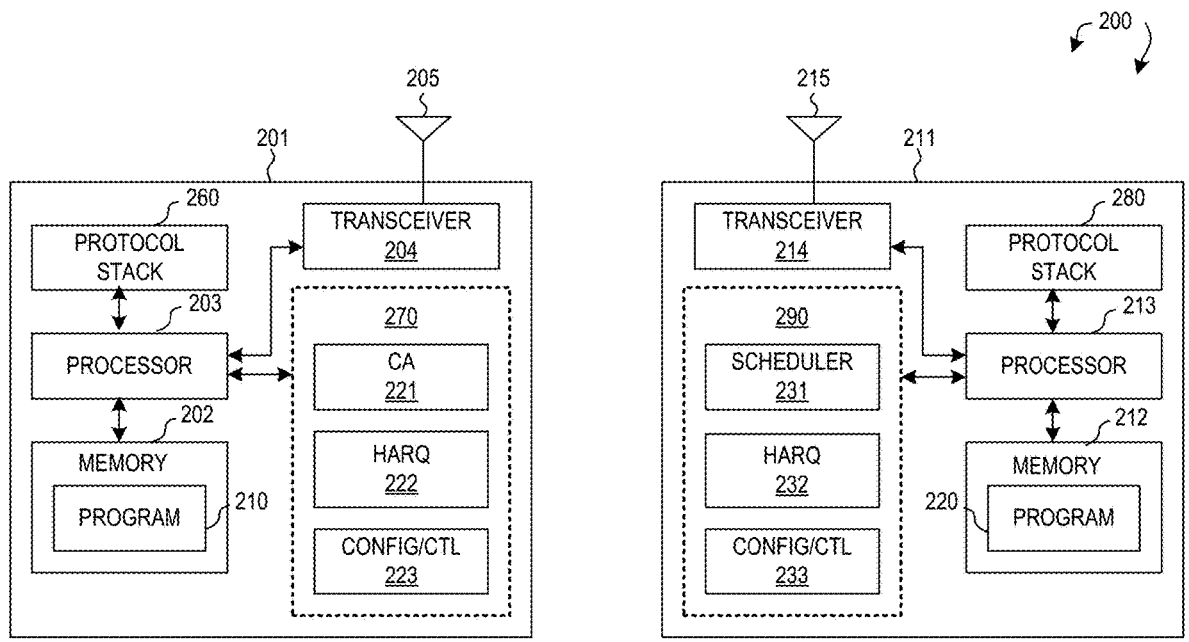
FIG. 2 illustrates simplified block diagrams of a base station and a user equipment in accordance with embodiments of the current invention.

FIG. 2 illustrates simplified block diagrams of wireless devices, e.g., a UE 201 and base station BS 211 in accordance with embodiments of the current invention. BS 211 has an antenna 215, which transmits and receives radio signals. A radio frequency RF transceiver module 214, coupled with the antenna, receives RF signals from antenna 215, converts them to baseband signals and sends them to a processor 213. RF transceiver 214 also converts received baseband signals from processor 213, converts them to RF signals, and sends out to antenna 215. Processor 213 processes the received baseband signals and invokes different functional modules and circuits to perform features in BS 211. Memory 212 stores program instructions and data 220 to control the operations of BS 211. In the example of FIG. 2, BS 211 also includes protocol stack 280 and a set of control functional modules and circuit 290. Scheduler 231 schedules DL and UL data transmission for UE under CA. HARQ handling circuit 232 handles HARQ operation and functionalities. Configuration and control circuit 233 provides different parameters to configure and control functionalities of UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise carrier aggregation handling circuit 221 that performs CA operation, an HARQ handling circuit 222 that performs HARQ operation, a config and control circuit 223 that handles connection establishment under CA and receives configuration and control parameters from the network for data TX/RX under CA.

Figure 3:
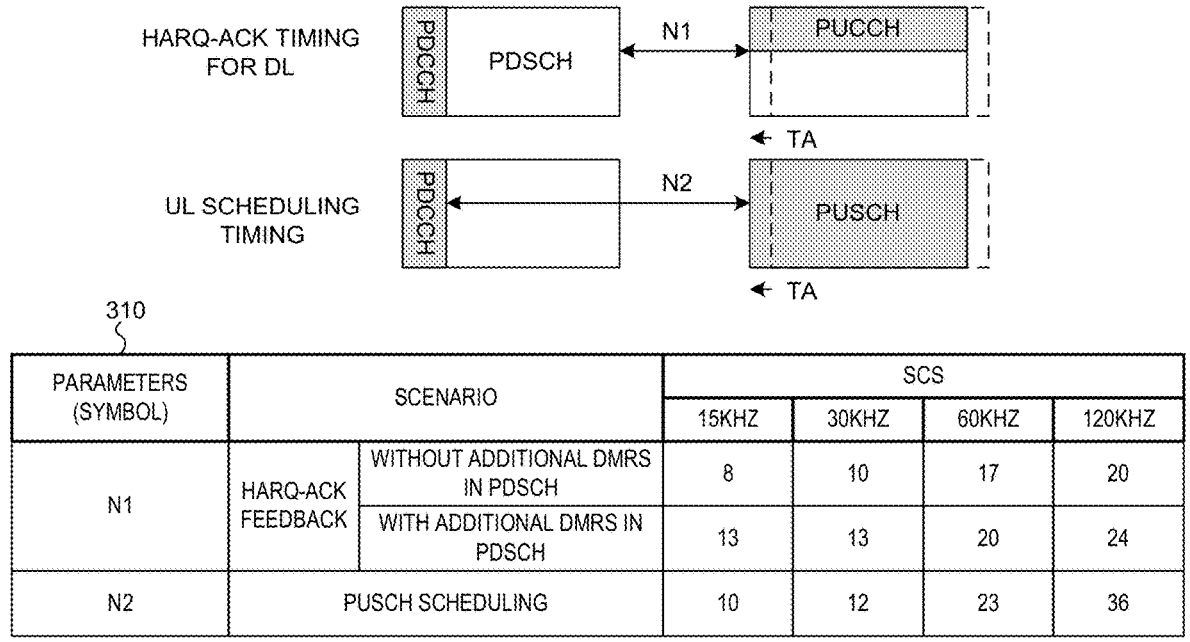
FIG. 3 illustrates examples of HARQ-ACK timing and UL scheduling timing and the UE processing time.

FIG. 3 illustrates examples of HARQ-ACK timing and UL scheduling timing and the UE processing time. Wireless communication is carried over a wireless channel in the form of radio frames, each radio frame consists of a number of subframes as defined in 4G specification. A subframe is also referred to as a slot in 5G specification. Each subframe or slot consists of a number of OFDM symbols. For a downlink DL data packet, it is transmitted over a physical downlink shared channel (PDSCH) to UE, and a corresponding HARQ-ACK is transmitted over a physical uplink control channel (PUCCH) to BS under a DL HARQ process. Uplink UL data packet is transmitted over a physical uplink shared channel (PUSCH) to BS. Both PDSCH and PUSCH are scheduled by a PDCCH to UE.

The HARQ-ACK timing for the downlink (N1 symbols) and the uplink scheduling timing for the uplink (N2 symbols) are both depicted in FIG. 3. Specifically, the HARQ-ACK timing is related to the time difference between the end of PDSCH reception of a data packet and the start of PUCCH transmission of corresponding HARQ-ACK. The UL scheduling timing is related to the time difference between the end of PDCCH reception of an UL grant and the start of PUSCH transmission of the corresponding UL data. TA is the timing advance related to propagation delay. In the example of FIGS. 3, N1 and N2 symbols depict the time period and such time period is related to UE processing time. To support different applications, e.g., low-latency application or high-performance application, multiple HARQ operation timings are supported in a wireless communication system. For applications that desire high-performance, HARQ-ARK timing with longer RTT may be applied to achieve higher throughput. For applications that desire low-latency, HAR-ACK timing with shorter RTT may be applied to achieve lower delay. The HARQ-ACK timing thus may be adaptively configured. Similarly, the UL scheduling timing can also be configured.

In 3GPP 5G specification, UE processing time is defined as a number of OFDM symbols, and HARQ-ACK timing and UL scheduling timing should be able to accommodate the UE processing time. Table 310 of FIG. 3 illustrates the requirement of UE processing time for HARQ-ACK (N1) and for UL scheduling (N2) under different scenarios and under different subcarrier spacing (SCS) values. For example, the requirement of UE processing time for HARQ-ACK without additional DMRS in PDSCH is 8, 10, 17, and 20 OFDM symbols when SCS is 15, 30, 60, and 120 kHz, respectively; the requirement of UE processing time for HARQ-ACK with additional DMRS in PDSCH is 13, 13, 20, and 24 OFDM symbols when SCS is 15, 30, 60, and 120 kHz, respectively; the requirement of UE processing time for PUSCH scheduling is 10, 12, 23, and 36 OFDM symbols when SCS is 15, 30, 60, and 120 kHz, respectively. For PUSCH scheduling, if the first symbol of the PUSCH is not DMRS only, then one more symbol is added. In one advantageous aspect, when carrier aggregation is applied, especially when intra-band non-contiguous carrier aggregation and inter-band carrier aggregation is applied, then the timing difference between difference cells is considered to relax the requirement of UE processing time.

Figure 4:
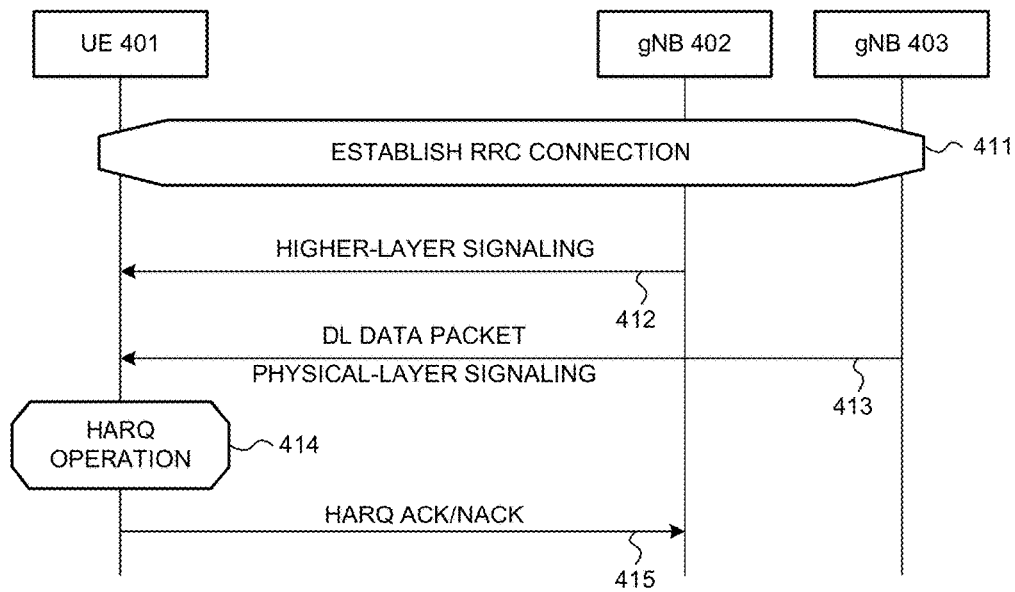
FIG. 4 illustrates a sequence flow of an HARQ operation with adaptive HARQ-ACK timing in accordance with one novel aspect.

FIG. 4 illustrates a sequence flow of an HARQ operation with adaptive HARQ-ACK timing in accordance with one novel aspect. In step 411, UE 401 establishes a primary radio resource control (RRC) connection with gNB 402 (primary base station) and a second data connection with gNB 403 (secondary base station). In step 412, gNB 402 transmits a higher-layer signaling, e.g., a set of supported HARQ-ACK timings. In step 413, gNB 402/403 schedules and transmits a DL data packet via a physical-layer signaling providing an actual applied HARQ-ACK timing for the DL data packet. At the receiver side, in step 414, UE 401 performs data decoding and checks whether the decoding is successful. If all the DL data is correctly decoded, then HARQ-ACK is feedback to gNB 402 in step 415. On the other hand, HARQ-NACK is feedback to gNB 402 in step 415. Note that the actual applied HARQ-ACK timing configured by the network needs to align with the UE processing time for HARQ-ACK. In one embodiment, UE 401 is configured for non-co-located CA. UE 401 is not expected to transmit corresponding HARQ-ACK in uplink for a scheduled DL data packet if the network sets the HARQ-ACK timing without meeting the relaxed UE processing time requirement under non-co-located CA.

Figures 5, 6:
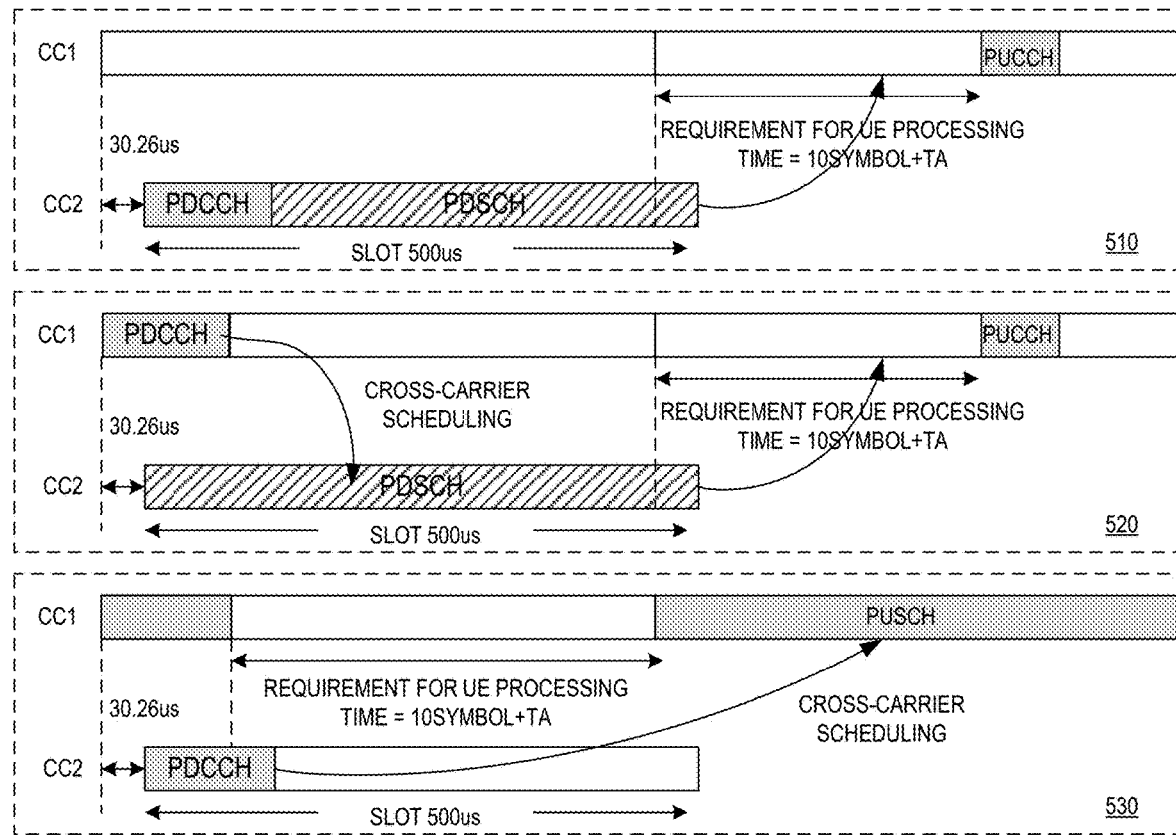
FIG. 5 illustrates examples of HARQ-ACK timing and PUSCH timing with or without cross-carrier scheduling for different cells in non-co-located CA.
FIG. 6 illustrates the maximum receive timing difference for intra-band non-contiguous and inter-band NR carrier aggregation.

FIG. 5 illustrates examples of HARQ-ACK timing and PUSCH timing with or without cross-carrier scheduling for different cells in non-co-located CA. In the example of FIG. 5, UE is configured with non-co-located CA, where CC1 and CC2 are aggregated to support wider transmission bandwidth. Suppose CC1 is the primary CC (PCELL) served by a primary base station and CC2 is the secondary CC (SCELL) served by a secondary base station. Under non-co-located CA, the primary base station and the secondary base station are not co-located, and there is significant timing difference between difference cells served by the non-co-located base stations. From 3GPP specification, the timing difference between the signals received from the PCELL and the SCELL at the UE receiver could be up to 30.26 us.

In one example depicted by 510 of FIG. 5 without cross-carrier scheduling, UE receives PDCCH for DL data on CC2 and then receives the DL data over PDSCH on CC2, which is 30.26 us later than CC1. However, UE needs to transmit the corresponding HARQ-ACK over PUCCH on CC1. Therefore, the UE processing time for decoding the DL data on CC2 and preparing to send the HARQ-ACK on CC1 is 30.26 us longer than normal non-CA scenario. Similarly, in another example depicted by 520 of FIG. 5, UE receives PDCCH for DL data on CC1, and then receives the DL data over PDSCH on CC2, which is 30.26 us later than CC1. However, UE needs to transmit the corresponding HARQ-ACK over PUCCH on CC1. Therefore, the UE processing time for decoding the DL data on CC2 and preparing to send the HARQ-ACK on CC1 is 30.26 us longer than normal non-CA scenario. For PUSCH timing depicted by 530 of FIG. 5, UE receives PDCCH for UL grant on CC2, and then transmits the UL data on CC1. Note that TA cannot reflect the timing difference because the UL HARQ-ACK or PUSCH transmission is transmitted on CC1 rather than on CC2. In all the above examples, the requirement of UE processing time for HARQ-ACK or PUSCH transmission needs to be relaxed by 30.26 us. If the SCS is 30 kHz, 30.26 us is almost one OFDM symbol, thus the requirement of UE processing time should be relaxed by one OFDM symbol. When the network configures the actual applied HARQ-ACK timing for the DL data, the network needs to consider such non-co-located CA scenario and requires the relaxed UE processing timing for HARQ-ACK. The relaxed UE processing timing is also applicable for PUSCH scheduling when non-co-located CA is operated on the UE.

FIG. 6 illustrates the maximum receive timing difference for intra-band non-contiguous and inter-band NR carrier aggregation. In case of carrier aggregation, the extra UE processing time needs to be introduced based on the maximum timing difference among CCs defined in the specification. If the UE is configured with multiple active CCs, the first uplink symbol which carries the HARQ-ACK information further include the effect of timing difference requirement between the CCs. Similarly, if the UE is configured with multiple active CCs, the first uplink symbol in the PUSCH allocation further includes the effect of timing difference requirement between the CCs. In NR, this value can be SCS-dependent. 610 of FIG. 6 depicts the maximum receive timing difference for intra-band non-contiguous NR carrier aggregation. 620 of FIG. 6 depicts the maximum receive timing difference for inter-band NR carrier aggregation. FR1 indicates the frequency range from 450-6000 MHz operating bands, and FR2 indicates the frequency range from 24250 to 52600 MHz for millimeter wave operating bands. For intra-band NR CA, the maximum receive timing difference requirement is 3 us for both FR1 and FR2 operating bands. For inter-band NR CA, the maximum receive timing difference requirement is 33 us for FR1 and 8 us for FR2. Therefore, the timing difference is about one OFDM symbol in case of 30K SCS. The network needs to consider such timing difference and requires relaxed UE processing timing when schedules for HARQ-ACK feedback and PUSCH UL data transmission.

Figure 7:
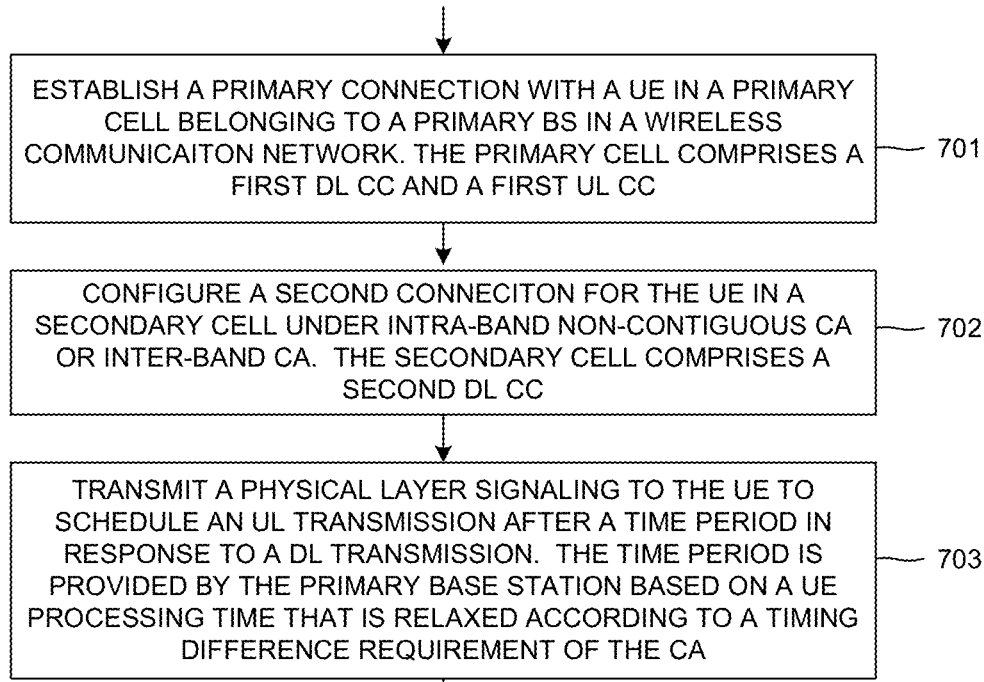
FIG. 7 is a flow chart of a method of providing a relaxed UE processing time for UL transmission from base station perspective in accordance with one novel aspect.

FIG. 7 is a flow chart of a method of providing a relaxed UE processing time for UL transmission from base station perspective in accordance with one novel aspect. In step 701, a primary base station establishes a primary connection with a user equipment (UE) in a primary cell in a wireless communication network. The primary cell comprises a first downlink (DL) component carrier (CC) and a first uplink (UL) CC. In step 702, the primary base station configuring a second connection for the UE in a secondary cell under intra-band non-contiguous carrier aggregation (CA) or inter-band CA. The secondary cell comprises a second downlink CC. In step 703, the primary base station transmits a physical-layer signaling to the UE to schedule an UL transmission after a time period in response to a DL transmission. The time period is provided by the primary base station based on a UE processing time that is relaxed according to a timing difference requirement of the CA.

Figure 8:
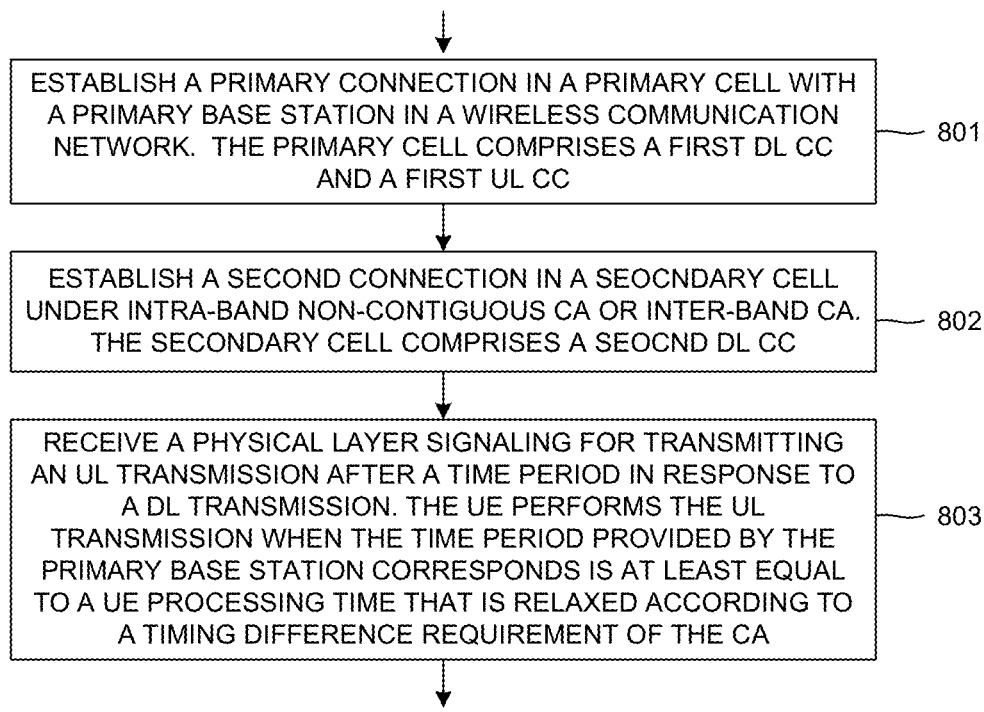
FIG. 8 is a flow chart of a method of determining a relaxed UE processing time for UL transmission from UE perspective in accordance with one novel aspect.

FIG. 8 is a flow chart of a method of determining a relaxed UE processing time for UL transmission from UE perspective in accordance with one novel aspect. In step 801, a UE establishes a primary connection in a primary cell with a primary base station in a wireless communication network. The primary cell comprises a first downlink (DL) component carrier (CC) and a first uplink (UL) CC. In step 802, the UE establishes a second connection in a secondary cell under intra-band non-contiguous carrier aggregation (CA) or inter-band CA. The secondary cell comprises a second downlink CC. In step 803, the UE receives a physical-layer signaling for transmitting an UL transmission after a time period in response to a DL transmission. The UE performs the UL transmission when the time period provided by the primary base station is at least equal to a UE processing time that is relaxed according to a timing difference requirement of the CA.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a primary connection in a primary cell with a primary base station by a user equipment (UE) in a wireless communication network, wherein the primary cell comprises a first downlink (DL) component carrier (CC) and a first uplink (UL) CC;
   establishing a second connection in a secondary cell under either intra-band non-contiguous carrier aggregation (CA) or inter-band CA, wherein the secondary cell comprises a second downlink CC; and
   receiving a physical-layer signaling for transmitting an UL transmission after a time period in response to a DL transmission, wherein the UE performs the UL transmission when the time period provided by the primary base station is at least equal to a UE processing time that is relaxed according to a timing difference requirement of the CA, wherein the relaxed UE processing time is included in the time period for a hybrid automatic repeat request (HARQ) ACK or for a scheduled uplink transmission.

2. The method of claim 1, wherein the physical-layer signaling schedules the DL transmission over the second DL CC, and wherein the UL transmission is a hybrid automatic repeat request (HARQ) ACK over the first UL CC.

3. The method of claim 2, wherein the physical-layer signaling is transmitted over the first DL CC.

4. The method of claim 2, wherein the physical-layer signaling is transmitted over the second DL CC.

5. The method of claim 1, wherein the DL transmission comprising an UL grant transmitted over the second DL CC, and wherein the UL transmission is scheduled by the UL grant and is transmitted over the first UL CC.

6. The method of claim 1, wherein the time period corresponds to an end time of the DL transmission and a start time of the UL transmission.

7. The method of claim 1, wherein the UE does not perform the UL transmission when the provided time period is shorter than the UE processing time.

8. A User Equipment (UE) comprising:
a control circuit that establishes a primary connection in a primary cell with a primary base station in a wireless communication network, wherein the primary cell comprises a first downlink (DL) component carrier (CC) and a first uplink (UL) CC;
a carrier aggregation (CA) handling circuit that establishes a second connection in a secondary cell under either intra-band non-contiguous CA or inter-band CA, wherein the secondary cell comprises a second downlink CC; and
a receiver that receives a physical-layer signaling for transmitting an UL transmission after a time period in response to a DL transmission, wherein the UE performs the UL transmission when the time period provided by the primary base station is at least equal to a UE processing time that is relaxed according to a timing difference requirement of the CA, wherein the relaxed UE processing time is included in the time period for a hybrid automatic repeat request (HARQ) ACK or for a scheduled uplink transmission.

9. The UE of claim 8, wherein the physical-layer signaling schedules the DL transmission over the second DL CC, and wherein the UL transmission is a hybrid automatic repeat request (HARQ) ACK over the first UL CC.

10. The UE of claim 9, wherein the physical-layer signaling is transmitted over the first DL CC.

11. The UE of claim 9, wherein the physical-layer signaling is transmitted over the second DL CC.

12. The UE of claim 8, wherein the DL transmission comprising an UL grant transmitted over the second DL CC, and wherein the UL transmission is scheduled by the UL grant and is transmitted over the first UL CC.

13. The UE of claim 8, wherein the time period corresponds to an end time of the DL transmission and a start time of the UL transmission.

14. The UE of claim 8, wherein the UE does not perform the UL transmission when the provided time period is shorter than the UE processing time.

15. A method comprising:
establishing a primary connection with a user equipment (UE) in a primary cell belonging to a primary base station in a wireless communication network, wherein the primary cell comprises a first downlink (DL) component carrier (CC) and a first uplink (UL) CC;
configuring a second connection for the UE in a secondary cell under carrier aggregation (CA), wherein the secondary cell comprises a second downlink CC, wherein the UE is configured with either intra band non-contiguous CA or inter-band CA; and
transmitting a physical-layer signaling to the UE to schedule an UL transmission after a time period in response to a DL transmission, wherein the time period is provided by the primary base station based on a UE processing time that is relaxed according to a timing difference requirement of the CA, wherein the relaxed UE processing time is included in the time period for a hybrid automatic repeat request (HARQ) ACK or for a scheduled uplink transmission.

16. The method of claim 15, wherein the physical-layer signaling schedules the DL transmission over the second DL CC, and wherein the UL transmission is a hybrid automatic repeat request (HARQ) ACK over the first UL CC.

17. The method of claim 16, wherein the physical-layer signaling is transmitted over the first DL CC.

18. The method of claim 16, wherein the physical-layer signaling is transmitted over the second DL CC.

19. The method of claim 15, wherein the DL transmission comprising an UL grant transmitted over the second DL CC, and wherein the UL transmission is scheduled by the UL grant and is transmitted over the first UL CC.

20. The method of claim 15, wherein the time period corresponds to an end time of the DL transmission and a start time of the UL transmission.

* * * * *